Feb. 14, 1956    T. TSCHUDI    2,734,489
ROTARY INTERNAL COMBUSTION ENGINE
Filed Dec. 3, 1953    3 Sheets-Sheet 1
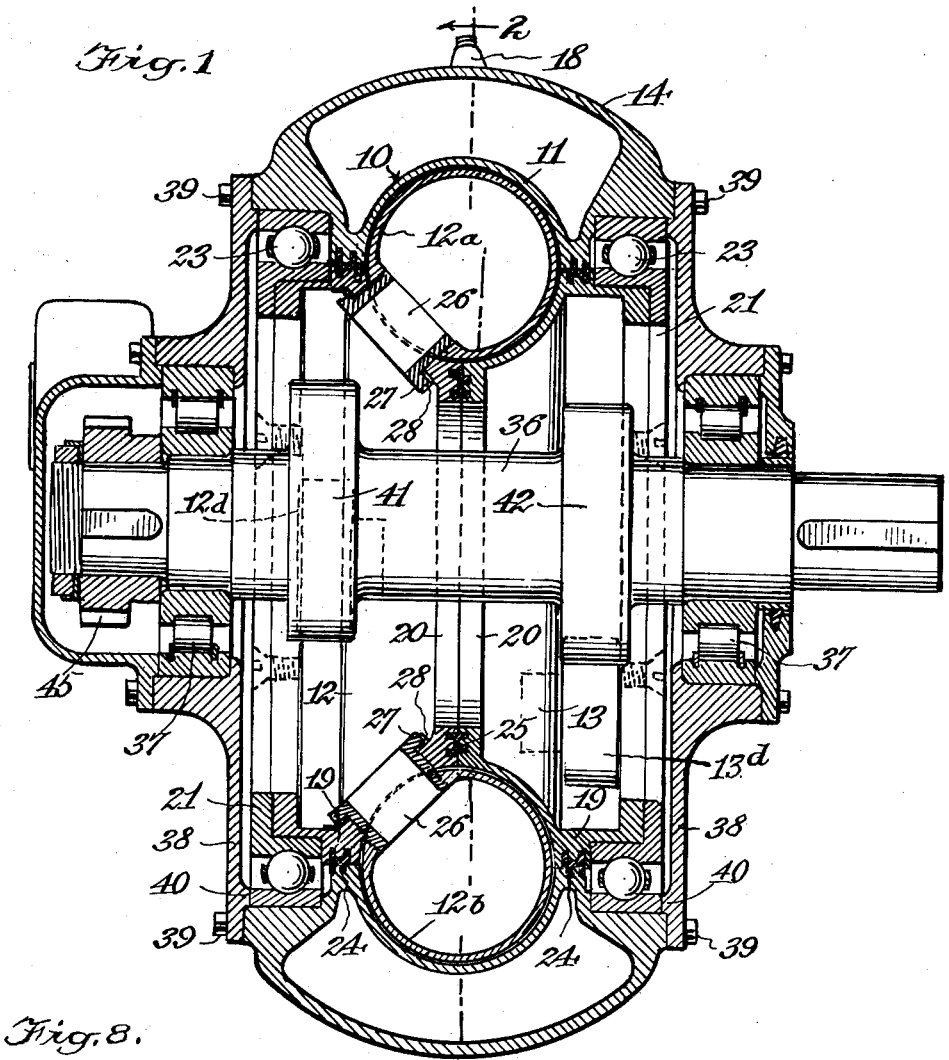
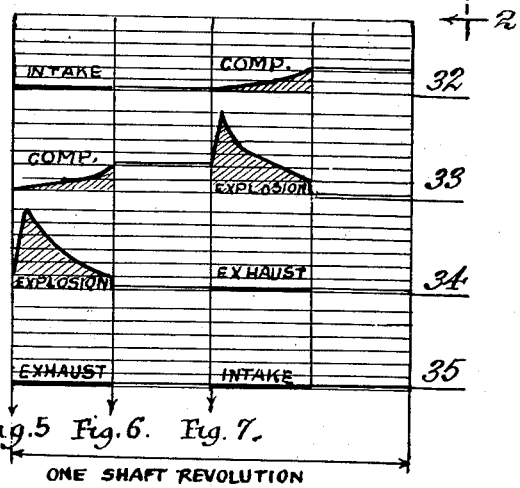
INVENTOR
Traugott Tschudi
BY Sylvester J. Liddy &
Arthur L. Nathanson
ATTORNEYS

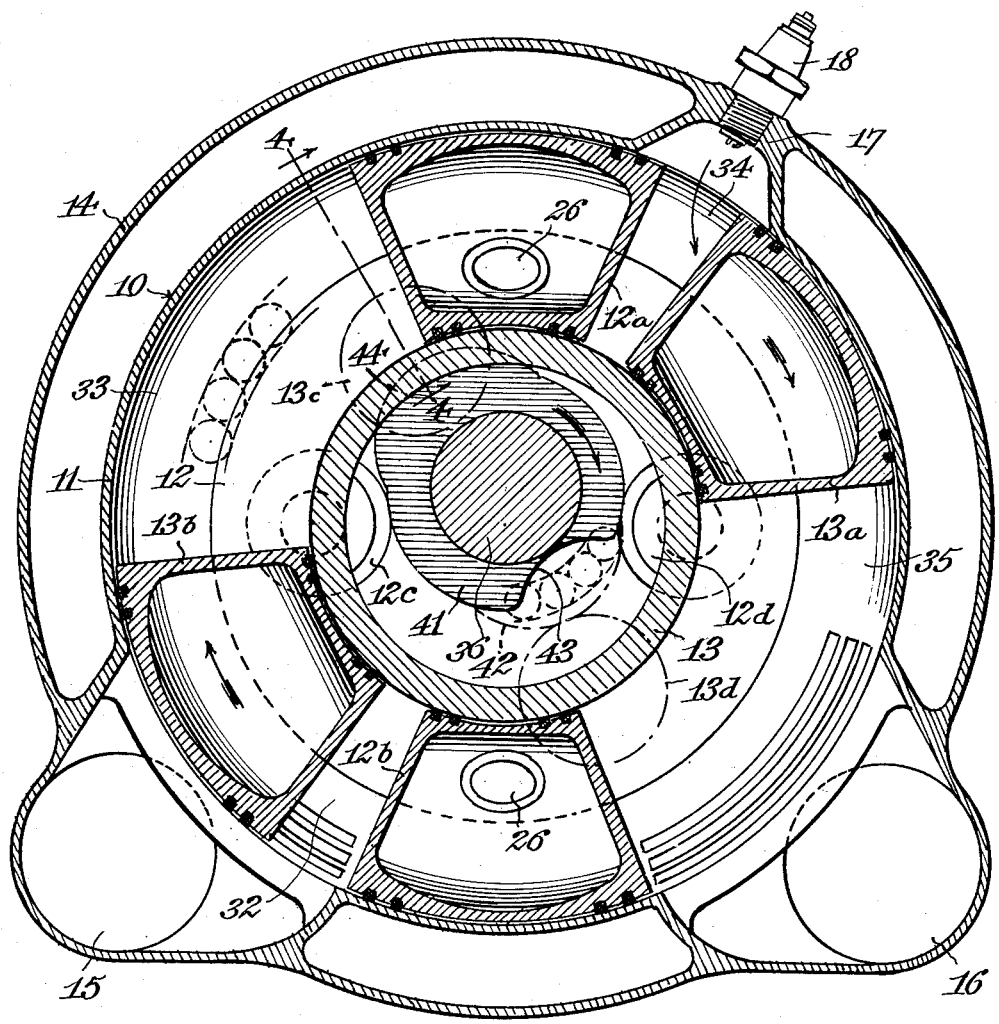

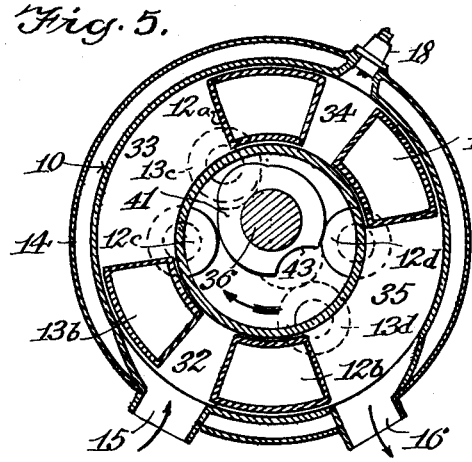
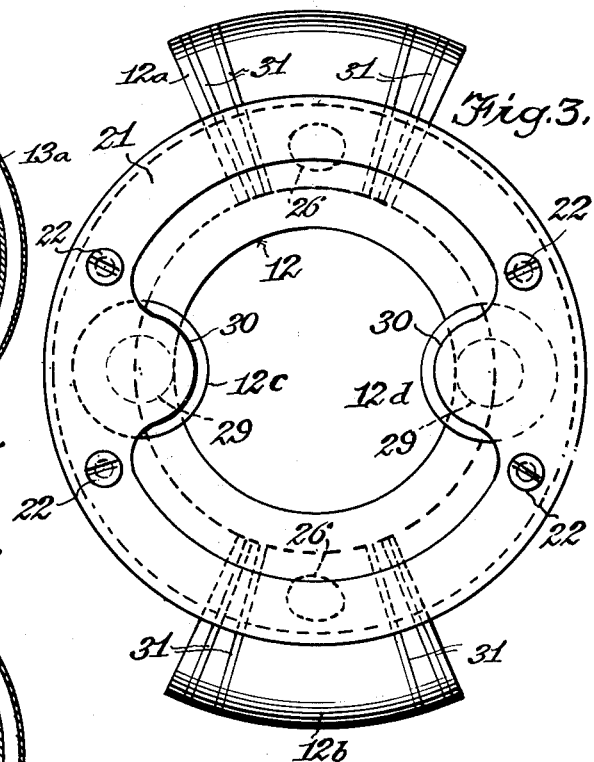
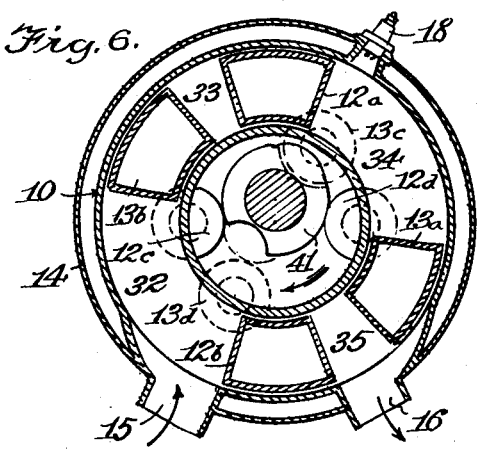
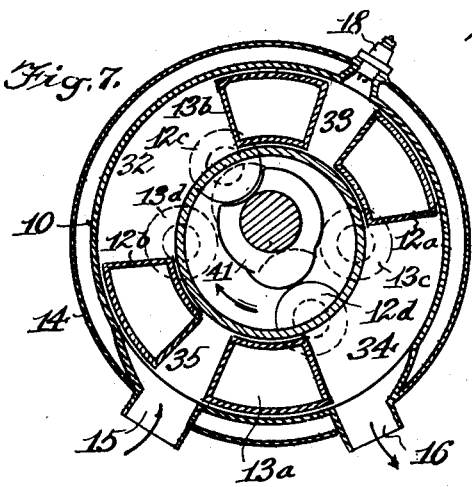
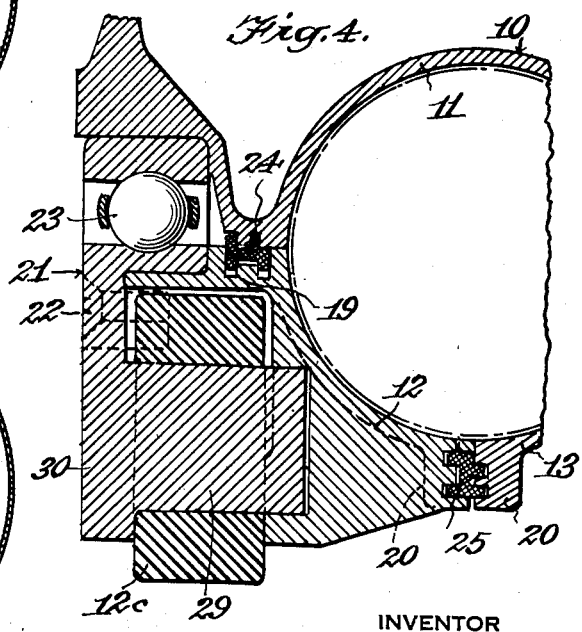

United States Patent Office 2,734,489
Patented Feb. 14, 1956

2,734,489
ROTARY INTERNAL COMBUSTION ENGINE
Traugott Tschudi, Flushing, N. Y.

Application December 3, 1953, Serial No. 395,948

5 Claims. (Cl. 123—11)

This invention relates to a valveless four cycle rotary internal combustion engine, and has especial reference to the type of engine disclosed in my United States Patents No. 1,641,911, granted September 6, 1927, and No. 1,732,995, granted October 22, 1929.

The type of engine under consideration generally and briefly stated comprises a toroidal cylinder composed of annular sections consisting of a stator and rotors, each rotor having a pair of arcuate pistons, the pistons of the rotors being arranged in said cylinder for subdividing the same into a plurality of chambers which upon relative movement of the pistons vary the size of said chambers thereby successively effecting the intake of the gaseous fuel, compression of the fuel, ignition of the compressed fuel, and exhaust of the products of combustion, twice per revolution of the drive shaft.

The principal object of the present invention is the provision of an engine of the indicated character which is comparatively simple in construction and operation, and one which is of efficient and effectual design.

The nature of the invention and its distinguishing features and advantages will appear when the following description is read in conjunction with the accompanying drawings, in which Fig. 1 is a vertical transverse sectional view of an engine embodying the features of the present invention.

Fig. 2 is a sectional view taken on the line 2—2 of Fig. 1.

Fig. 3 is a side view of one of the rotor assemblies.

Fig. 4 is an enlarged detail sectional view taken on the line 4—4 of Fig. 2.

Figs. 5, 6 and 7 are diagrammatic views showing different stages in the operation of the engine.

Fig. 8 is a graph showing sequences of the intake, compression, explosion and exhaust respecting the two rotors of the engine.

The present engine has a toroidal cylinder 10 comprising three annular sections consisting of a cross-sectionally semi-circular stator 11 and cross-sectionally quarter-circular rotors 12 and 13 respectively. The stator and rotors are made preferably of aluminum alloy.

The stator 11 has a water cooling jacket 14 formed integral therewith and extending circumferentially and externally thereof. Also formed integral with the stator are a gaseous fuel intake port 15, an exhaust port 16, and a tap 17 for an ignition device 18. The ports 15 and 16 and the device 18 communicate with the interior of the cylinder 10.

The rotors 12 and 13 are similar although certain features common to both rotors are reversely arranged in the association of the rotors. Each of the rotors has circular rims 19 and 20 respectively. A ring 21 is secured concentrically to each rotor by flat head machine screws 22. Roller bearings 23 are interposed between the rims 19 respectively and the stator 11, the latter having circular surfaces to respectively accommodate the bearings 23, and the inner race of each of the bearings being formed integral with the related ring 21. The stator and rotors have complemental grooves which accommodate self-expansion packing rings 24. Likewise the opposing rims 20 of the rotors have complemental circular grooves therein which accommodate self-expansion packing rings 25.

The rotor 12 has a pair of hollow arcuate pistons 12a and 12b. These pistons are arranged diametrically opposite each other, and each piston is rigidly secured to the rotor 12 by a tubular fastening element 26. The element 26 has one end in threaded engagement with the piston, and the other end of said element 26 has a flange 27 in contact with a gasket 28 in contact with the rotor. The element 26 makes it possible for oil to enter the related piston to aid in cooling the piston. The rotor 12 has a pair of rollers 12c and 12d mounted on arbors 29 respectively. The arbors are integral with the lugs 30, respectively, on the ring 21, said lugs extending radially inward from the ring with the arbors disposed diametrically opposite each other so that the axes of said rollers are diametrically opposite each other and spaced ninety degrees with respect to the transverse centers of the pistons 12a and 12b, as appears most clearly in Fig. 3. The rollers turn on the arbors 29 and also travel in an orbital path with respect to the center of the cylinder 10. For stability, the arbors 29 are long enough to extend into sockets in the related rotor.

The rotor 13 has a pair of hollow arcuate pistons 13a and 13b, like the pistons 12a and 12b. The rotor 13 also has a pair of rollers 13c and 13d. Since the pistons and rollers of the rotor 13 are operatively assembled in the manner and by means similar to those of the pistons and rollers of the rotor 12, corresponding parts are given similar reference numerals for the sake of brevity.

The pistons made preferably of aluminum alloy are of the same dimensions and have the usual compression rings 31. The pistons are arranged in the cylinder 10 subdividing the interior thereof into four chambers 32, 33, 34 and 35 which upon relative circumferential movement of the pistons become varied in size for successively and periodically effecting the intake of a gaseous fuel, the compression of the fuel, the explosion of the compressed fuel, and the exhaust of the spent gases, twice for each revolution of the drive shaft 36.

The shaft 36 extends crosswise of the cylinder 10 eccentric to the center of the cylinder. The shaft is supported by roller bearings 37 carried by plates 38 respectively. The plates are bolted to the stator 11, as at 39, at opposite sides respectively. Each of the plates 38 has a circular abutment 40 which bears on the outer race of the adjacent bearing 23 to hold the bearing and related rotor operatively disposed.

On the drive shaft 36 are cams 41 and 42. The cams are identical. Each cam is substantially ovate except for a concave depression 43 diametrically opposite a convex end portion 44, and the cam being symmetrical about its longitudinal axis. The cams are axially spaced on the shaft 36 so that the cam 41 is in a cooperative relation to the rollers 12c and 12d, and the cam 42 is in a cooperative relation to the rollers 13c and 13d. The cams are angularly offset one hundred and eighty degrees with respect to each other.

Operation is as follows. Assuming that the engine has been started by hand so that there is an intake of gaseous fuel and the parts are in the relation shown in Fig. 5 and the shaft 36 is rotating in a clockwise direction, the pistons 12a and 12b are at vertical center and the rollers 12c and 12d are in contact with the cam 41 at opposite sides respectively of the longitudinal axis of the cam. This prevents the pistons 12a and 12b from moving in either direction with respect to the shaft 36 although they move with the shaft. At the same time the roller 13c is in the depression 43 of the cam 42 and the roller 13d is unobstructed by the portion 44 of cam 42. The compressed charge of fuel in the chamber 34 is exploded by the device 18 thereby causing a power impulse to be exerted on the piston 13a. This power impulse is transmitted to the shaft 36 through the intervention of the parts 26, 13, 22, 21, 30, 29, 13c and 42 in the order named. The pistons 13a and 13b travel sixty degrees at a rate of speed faster than that of the pistons 12a and 12b. During this period the chamber 32 in registry with the intake port 15 receives a charge of fuel, the fuel charge in the chamber 33 is being compressed, the fuel charge in the chamber 34 is ready to be exploded, and the spent gases in the chamber 35 pass into the exhaust port 16.

When the explosion takes place in the chamber 34, the parts instantly thereafter assume the relation shown in Fig. 6. This is followed by the parts assuming the relation shown in Fig. 7. At this time the chamber 35 is receiving a charge of fuel, the charge of fuel in the chamber 32 is about to be compressed, the compressed charge of fuel in the chamber 33 is about to be exploded, and the spent gases in the chamber 34 are being exhausted. As appears from Fig. 7 the pistons 13a and 13b have reached the vertical center position, the rollers 13c and 13d are in contact with the cam 42 at the opposite sides respectively of the longitudinal axis of the cam, the roller 12c is in the depression 43 of cam 41 and the roller 12d is unobstructed at the portion 44 of cam 41. When the compressed charge of fuel in the chamber 33 is exploded a power impulse will be exerted on the piston 12a and transmitted to the shaft 36 through the intervention of the parts 26, 12, 22, 21, 30, 29, 12c and 41 in the order named, thereby duplicating the action of the rotor assembly 12. In this manner two power impulses are transmitted to the drive shaft 36 during a single revolution. The power impulses are transmitted by the four pistons as follows, namely, 13a, 12a, 13b and 12b successively during two revolutions and repeatedly every two revolutions. The shaft 36 may have connected therewith a gear 45 for transmitting motion to a magneto and an oil pump.

I claim:

1. In a rotary four cycle internal combustion engine, a toroidal cylinder comprising annular sections consisting of an outer stator semi-circular in cross-section and inner rotors quarter-circular in cross-section, a drive shaft extending across said cylinder and whose axis of rotation is eccentric with respect to the center of the cylinder, pairs of arcuate pistons fixed to said rotors respectively and operable within said cylinder, the pistons of each pair being disposed diametrically opposite each other, said pistons capable of subdividing the cylinder circumferentially into four chambers, said stator having a gaseous fuel intake port, an exhaust port, and an ignition device, said intake port, exhaust port and ignition device communicating with the interior of said cylinder, pairs of rollers respectively on said rotors, the rollers of each pair being disposed diametrically opposite each other and angularly spaced ninety degrees from the transverse centers of the related pistons, and means on said drive shaft which cooperate with the rollers in timed accord causing two power impulses by said pistons on said drive shaft during each revolution of the drive shaft through the intervention of said rotors.

2. In a rotary four cycle internal combustion engine as set forth in claim 1, wherein said means on the drive shaft comprises axially spaced and angularly offset cams, and there being one cam for each pair of said rollers.

3. In a rotary four cycle internal combustion engine as set forth in claim 2, wherein each of said cams has a concave depression therein and a convex end portion opposite said depression.

4. In an internal combustion engine of the character described, a rotary shaft, two rotary propulsion units each including a pair of rollers diametrically opposite each other and movable in a circular path about the axis of said shaft, the rollers of one unit being spaced angularly ninety degrees with respect to the rollers of the other unit, similar cams on said shaft in axially spaced relation, there being one of said cams for cooperation with the pair of rollers of each one of said units, and each of said cams having a depression therein, the provision and arrangement being such that the rollers of each unit successively enter the depression of their related cam while the rollers of the other unit engage their related cam on opposite sides respectively of the center of the cam and are held from moving with respect to the shaft, thereby imparting power impulses to said shaft periodically.

5. In an internal combustion engine as set forth in claim 4, wherein each of said cams is substantially ovate except for its depression and is symmetrical about its longitudinal axis.

References Cited in the file of this patent

UNITED STATES PATENTS

| | | |
|---|---|---|
| 1,298,839 | Weed | Apr. 1, 1919 |
| 1,732,995 | Tschudi | Oct. 22, 1929 |